No. 12,453. REISSUED FEB. 20, 1906
T. DUNCAN.
ELECTRIC METER.
APPLICATION FILED AUG. 9, 1905.
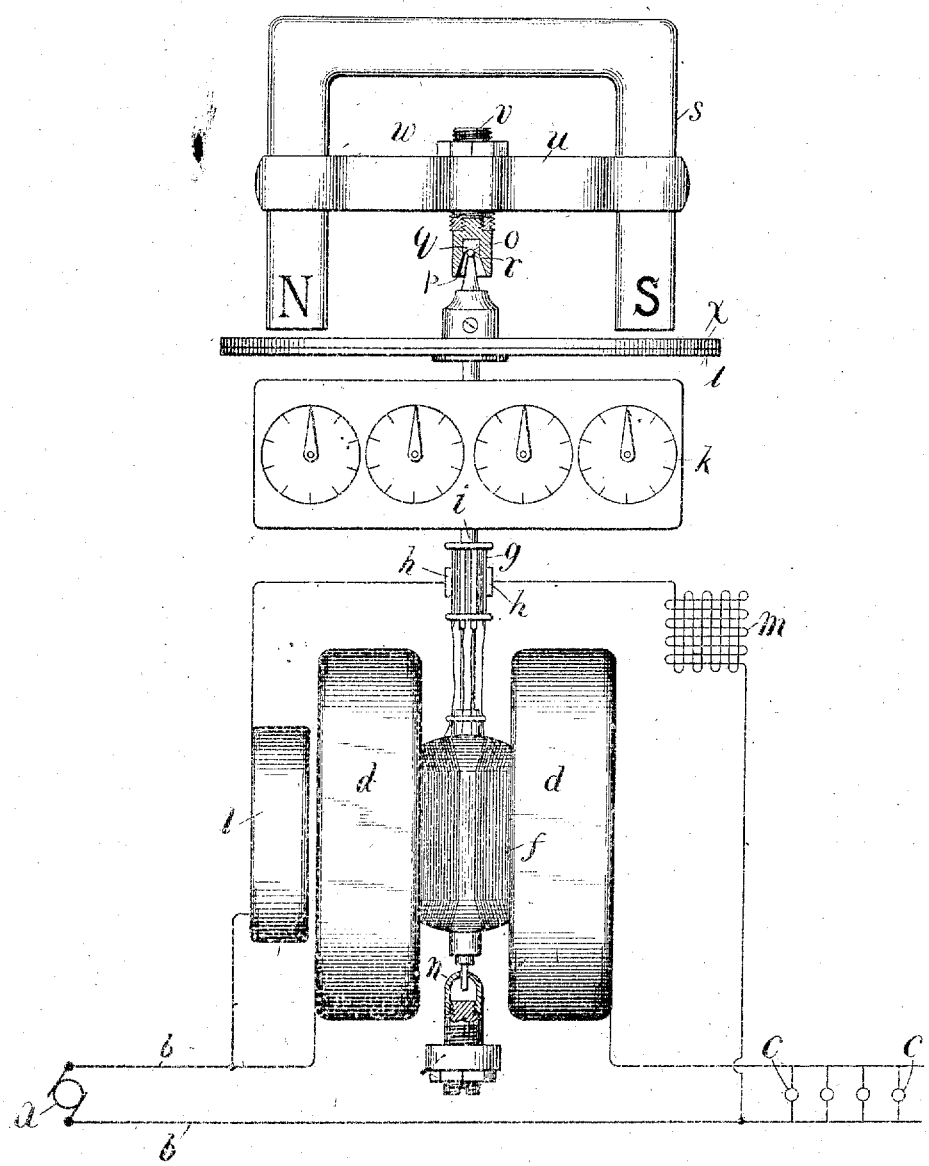
WITNESSES.
Chas. F. Bassett
Leon Stroh
INVENTOR
Thomas Duncan
By George H. Bugg
ATTY.

UNITED STATES PATENT OFFICE.

THOMAS DUNCAN, OF LA FAYETTE, INDIANA, ASSIGNOR TO DUNCAN ELECTRIC MANUFACTURING CO., OF LA FAYETTE, INDIANA, A CORPORATION OF ILLINOIS.

ELECTRIC METER.

No. 12,453. Specification of Reissued Letters Patent. Reissued Feb. 20, 1906.

Original No. 796,067, dated August 1, 1905. Application for reissue filed August 9, 1905. Serial No. 273,485.

*To all whom it may concern:*

Be it known that I, THOMAS DUNCAN, a citizen of the United States, residing at La Fayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to electric meters, and has for its object the provision of improved mechanism whereby the rotating elements of the meters may be accurately and effectively suspended magnetically, the invention being of particular utility in connection with commutated motor-integrating wattmeters. Commutated motor-wattmeters as at present placed upon the market each employ a revoluble member consisting of a spindle having a lower end-thrust bearing and an upper side-thrust bearing and carrying the armature and damping-disk. The end-thrust bearing at the bottom of the spindle is usually a sapphire jewel, which becomes easily broken or is roughened in a short time by the action of the spindle-point. This roughening or wearing of the jewel-bearing and spindle-point is augmented to quite an extent by the entrance of dust within the meter, which settles upon the jewel and mixing with the oil used in the jewel-cavity forms a grinding mixture that frequently speedily destroys the polished bearing-surfaces of both jewel and spindle-point. This roughening results, primarily, in causing the meter to be slow on some loads and if permitted to continue the characteristic of the meter is lowered throughout its entire range. When this condition is present, it means that the central station may be supplying energy at a loss in view of the fact that the major portion of the meters are usually in service on the low load end of their characteristics.

One feature of my invention resides in the provision of an end-thrust bearing for the upper end of the meter-shaft in combination with means for magnetically suspending the meter-shaft, said end-thrust bearing being so constructed as to limit the said shaft or spindle to a single axis of rotation, there being associated elsewhere with the meter-shaft, preferably at its lower end, a side-thrust bearing that coöperates with the end-thrust bearing in confining the spindle to a single axis of rotation. One element of the magnetic suspension device is mounted exterior of the meter-rotating member and is desirably in the form of a permanent magnet, a complemental member of the magnetic suspending device being a body of magnetic material preferably fixedly secured upon the meter-spindle, said body of magnetic material being preferably in the form of a disk that is disposed in a plane at right angles to the axis of rotation of the spindle, and therefore lying in the plane of rotation of said spindle. The upper end-thrust bearing is made adjustable with respect to the permanent magnet so that the extent to which the upper end of the shaft is moved against its end-thrust bearing may be nicely determined, such adjustment being longitudinal of the spindle.

Another feature of my invention resides in means whereby the suspending magnet is enabled not only to support the rotating element of the meter, but also acts as a damping or retarding magnet, to which end the shaft of the meter carries a damping-disk arranged within the influence of said magnet to secure a proper retardation in the speed of the meter. The disk of magnetic material and the damping-disk are preferably assembled into a composite disk, both being subject to the same flux from the suspending magnet, the retarding-disk being desirably interposed between the suspending magnet and the damping-disk to secure the best effect upon said damping-disk.

I will explain my invention more fully by reference to the accompanying drawing, illustrating certain structural features thereof and diagrammatically the connections thereof.

In the drawing there is shown any suitable source of current *a*, that supplies the mains *b b*, that extend to a district of consumption, at which I have indicated lamp *c*. The current or field-winding of the meter is subdivided into coils *d d*, included in one of the mains *b*. The pressure-winding of the meter, the meter illustrated being a commutated motor-integrating wattmeter, is subdivided into coils constituting an armature *f*, which armature is provided with a commutator whose segments *g* engage the commutatorbrushes *h h*. The commutator and armature are mounted upon the meter spindle or shaft *i*, which may have any well-known and suitable mechanical connection with the counting mechanism *k*, that serves to integrate and record the energy passing through the mains. The armature has desirably included in circuit therewith a torque or compensating-coil *l*, provided for the purpose of overcoming initial friction, there being also desirably a resistance *m* in the armature-bridge for adapting the meter to a selected voltage. The lower end of the shaft instead of being provided with an end-thrust bearing, as hitherto, is provided with a side-thrust bearing *n*, that serves to engage the side of the spindle or a reduced portion thereof to prevent material lateral deflection of this part of the spindle. The upper end-thrust bearing *o* is provided with a flaring recess *p*, narrowing toward the top and flaring toward the bottom, so that the upper end of the spindle will readily be guided into place and practically limited to a single axis of rotation. At the upper end of the conical recess in the bearing *o* is a jewel-block *q*, with which I desirably engage a hard-steel ball *r*, that in turn is engaged by the upper end of the spindle. The bearing *o*, it will be apparent, is in the form of an inverted cup, obstructing the passage of dust and preventing its lodgment upon the jewel-block. The engagement between the meter-spindle (which may be considered as including as one of its sections the hard-metal ball *r*) and the upper end-thrust bearing is desirably effected by stationarily-mounted permanent magnet *s*, preferably of horseshoe form, within whose field is arranged a disk *t* of magnetic material, preferably of iron. In order that the degree of pressure of the upper end of the shaft against its end-thrust bearing may be nicely regulated with respect to the flux and the weight of the rotating element supported thereby, I provide means whereby the said upper thrust-bearing may be adjusted axially or lengthwise of the spindle and with reference to the supporting-magnet. To this end the upper bearing is desirably mounted upon a brace *u*, which may for convenience be attached to the permanent magnet and which at its central portion has engagement with a threaded bolt *v*, with which the bearing *o* desirably has separable and threaded engagement. A vertical adjustment of the bolt *v* may be had by turning it within the supporting-brace *u*, which adjustment after being secured may be maintained by a set-nut *w*. The same magnet that effects the magnetic suspension of the shaft *i* with the commutator and armature also desirably effects a retarding influence, for which purpose a damping-disk *x* of non-magnetic metal, as aluminium, is mounted upon the spindle. In order that the same damping-magnet may most effectively operate upon the damping-disk and at the same time support or suspend the rotating element, said disks *t* and *x* are compounded or formed into one mechanical structure.

I do not wish to be limited to the precise way in which the compound disk is made up, as other means may be devised for making the compound disk of magnetic and non-magnetic metals for the purposes set forth. By means of the adjustable upper end-thrust bearing the ball *r* may be made to press just slightly against the jewel *q*, thereby greatly reducing the wear of the parts. In the preferred embodiment of the invention the ball *r* is magnetized and in that way held in place as a part of the meter-spindle.

By the term "stationarily-mounted magnet" I mean a magnet normally held in a substantially fixed position.

It is obvious that changes may be made in the construction shown without departing from the spirit of my invention, and I do not, therefore, wish to be limited to the precise mechanism illustrated; but,

Having thus described my invention, I claim as new and desire to secure by Letters Patent—

1. The combination with a motor-wattmeter whose shaft has a lower bearing, and an upper inverted end-thrust bearing, of a magnetic suspension device for supporting the rotating element of the meter, and mechanism for effecting adjustment of the end-thrust bearing axially of the shaft, the bearing at the upper end of the shaft serving to aline the shaft at the upper end and to prevent lateral deflection thereof mechanically, substantially as described.

2. The combination with a motor-wattmeter whose shaft has a lower side-thrust bearing, and an upper inverted end-thrust bearing, of a magnetic suspension device for supporting the rotating element of the meter, and mechanism for effecting adjustment of the end-thrust bearing axially of the shaft, the bearing at the upper end of the shaft serving to aline the shaft at the upper end and to prevent lateral deflection thereof mechanically, substantially as described.

3. The combination with a motor-wattmeter whose shaft has a lower bearing, and an upper inverted end-thrust bearing substantially confining the upper end of the meter-shaft to a single axis of rotation, of a magnetic suspension device for supporting the rotating element of the meter, and mechanism for effecting adjustment of the end-thrust bearing axially of the shaft, the bearing at the upper end of the shaft serving to aline the shaft at the upper end and to prevent lateral deflection thereof mechanically, substantially as described.

4. The combination with a motor-wattmeter whose shaft has a lower side-thrust bearing, and an upper inverted end-thrust end-thrust bearing axially of the shaft and with reference to said magnet, said bearings substantially confining the shaft to a single axis of rotation, the bearing at the upper end of the shaft serving to aline the shaft at the upper end and to prevent lateral deflection thereof mechanically, substantially as described.

13. The combination with a motor-wattmeter whose shaft has a lower bearing and an upper inverted end-thrust bearing, of a magnetic device including a stationarily-mounted magnet and a body of magnetic material moving with the rotating element of the meter and arranged within the field of said magnet, said end-thrust bearing being constructed to confine the upper end of the shaft to a substantially fixed axis of rotation, the bearing at the upper end of the shaft serving to aline the shaft at the upper end and to prevent lateral deflection thereof mechanically, substantially as described.

14. The combination with a motor-wattmeter whose shaft has a lower side-thrust bearing and an upper inverted end-thrust bearing, of a magnetic device including a stationarily-mounted magnet and a body of magnetic material moving with the rotating element of the meter and arranged within the field of said magnet, said bearings serving to confine the shaft to a substantially fixed axis of rotation, the bearing at the upper end of the shaft serving to aline the shaft at the upper end and to prevent lateral deflection thereof mechanically, substantially as described.

15. The combination with a motor-wattmeter whose shaft has a lower bearing and an upper inverted end-thrust bearing, of a magnetic device including a stationarily-mounted magnet and a body of magnetic material moving with the rotating element of the meter and arranged within the field of said magnet, said bearings serving to confine the shaft to a substantially fixed axis of rotation, the bearing at the upper end of the shaft serving to aline the shaft at the upper end and to prevent lateral deflection thereof mechanically, substantially as described.

16. The combination with a motor-wattmeter, of a stationarily-mounted suspending magnet and a disk of magnetic material upon the shaft and within the field of said magnet to support the rotating element of the meter, and a damping or retarding disk also subject to the influence of said magnet that thus acts also as a damping-magnet, said disks being assembled into a compound disk, the bearing at the upper end of the shaft serving to aline the shaft at the upper end and to prevent lateral deflection thereof mechanically, substantially as described.

17. The combination with a motor-wattmeter, of a stationarily-mounted suspending magnet, and a compound disk of magnetic and non-magnetic metal upon the shaft and within the field of said magnet to support and retard the rotating element of the meter, the bearing at the upper end of the shaft serving to aline the shaft at the upper end and to prevent lateral deflection thereof mechanically, substantially as described.

18. The combination with a motor-wattmeter, of a stationarily-mounted suspending magnet and a disk of magnetic material upon the shaft and within the field of said magnet to support the rotating element of the meter, and a damping or retarding disk also subject to the influence of said magnet that thus acts also as a damping-magnet, said disks being assembled into a compound disk, substantially as described.

19. The combination with a motor-wattmeter, of a stationarily-mounted suspending magnet, and a compound disk of magnetic and non-magnetic metal upon the shaft and within the field of said magnet to support and retard the rotating element of the meter, substantially as described.

20. The combination with a motor-meter, of a suspending magnet, and a compound disk of magnetic and non-magnetic metal upon the shaft and within the field of said magnet to support and retard the rotating element of the meter, substantially as described.

In witness whereof I hereunto subscribe my name this 7th day of August, 1905.

THOMAS DUNCAN.

Witnesses:

SADIE E. ELY,

JOHN R. PFROMMER.